No. 4,575. PATENTED JUNE 16, 1846.
G. S. SCHOFIELD.
MACHINERY FOR CUTTING BOOKBINDERS' BOARDS.

2 SHEETS—SHEET 2.

UNITED STATES PATENT OFFICE.

GEORGE S. SCOFIELD, OF PHILADELPHIA, PENNSYLVANIA.

MACHINERY FOR CUTTING BOOKBINDERS' BOARDS.

Specification of Letters Patent No. 4,575, dated June 16, 1846.

*To all whom it may concern:*

Be it known that I, GEORGE S. SCOFIELD, of the city of Philadelphia, in the State of Pennsylvania, have invented certain new and useful Improvements in Machines for Cutting Bookbinders' Boards, Pasteboard, Paper, &c., into Strips or Pieces of Regular Width; and I do hereby declare that the following is a full and exact description thereof.

In my machine for cutting bookbinders' boards, &c., into strips, or widths, I employ two shafts, upon which I place circular cutters, in pairs, so that by the revolution of the said shafts, the respective pairs of cutters, having their edges intersecting with each other, shall operate on the article to be cut in the manner of shears; these cutters being made adjustable on their shafts, so that their distance apart may be nicely regulated, and may thereby be made to cut the material acted upon simultaneously into any required number of strips, and of any desired width. These cutting shafts I place horizontally one above the other, and on each side of them, I place a pair of feeding or drawing rollers made of hard wood, which may be of the same diameter with the circular cutters, or nearly so; this however is a point of no importance, but these feeding or drawing rollers are to meet each other in a line coinciding horizontally with that in which the cutters operate, as one pair of them receives the board from the feeding table before it is cut and directs it toward the cutters, while the other pair receives it as it is cut into strips, and conducts it off from the machine; these rollers are all made adjustable by means of set screws operating on the boxes in which their gudgeons revolve. The gudgeons of the cutting shafts and of the guide rollers, are to be geared together at one end of the machine by means of small cog wheels which will be equal in size when the cutters and guide rollers are equal in diameter they being so geared as that they shall all revolve in the direction necessary for receiving the article to be cut from the feeding board, and for conducting it off from the machine when cut.

On the level of the junction of the first pair of rollers, that is to say, those that conduct the board toward the cutters, there is a feeding table upon which the board or paper is to be laid, and which is furnished with a slide by which said board or paper will be made to advance toward the rollers in a right line and square with the edges.

Figure 1:
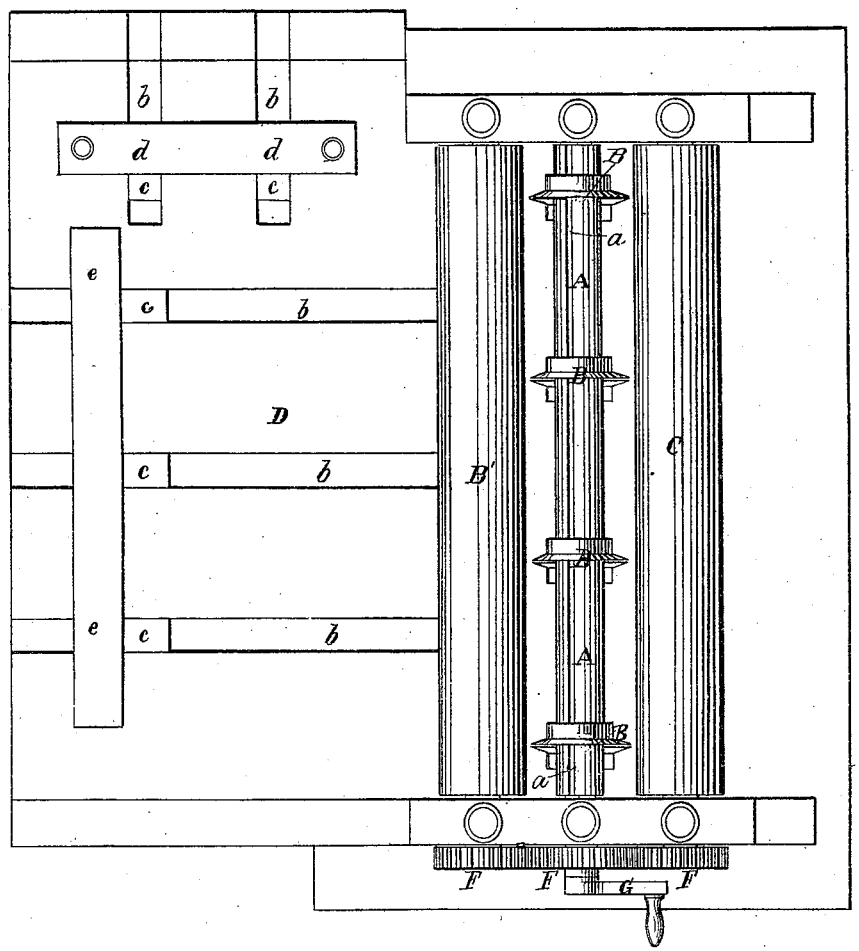
Figure 2:
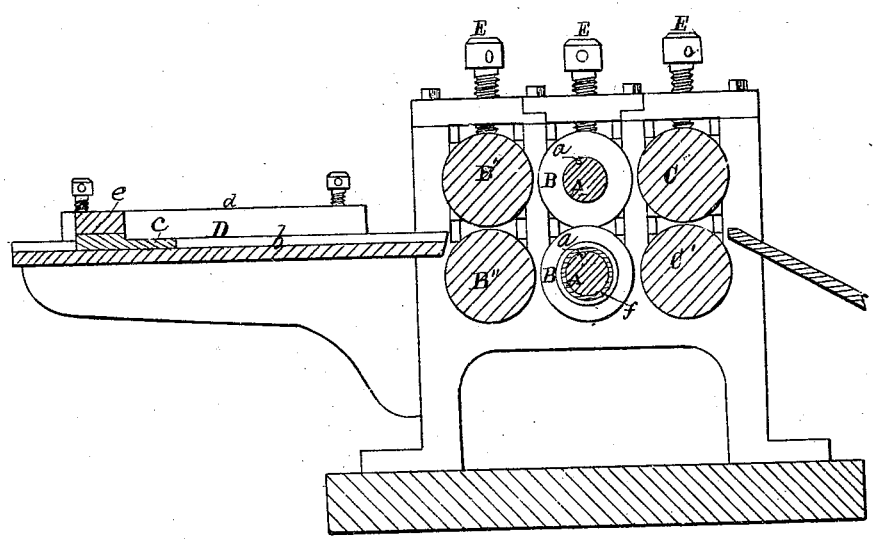

In the accompanying drawing, Figure 1 is a top view of the machine, and Fig. 2 a vertical section thereof in the line $x\ x$ of Fig. 1.

In each of these figures where the same parts occur they are designated by the same letters of reference.

A A are iron shafts that carry the circular steel cutters B B, which are furnished with ferrules or sockets that slide upon these shafts so as to set them at the proper distances apart. Along the shafts A, A, I usually make a groove $a\ a$, to receive a feather, or pin on the inner side of the sockets of the cutters, so as to cause them to revolve together; and the cutters may be held in place by means of a tightening screw or wedge. In most instances there will be certain determinate sizes or widths, into which it will be required that the boards should be cut; and to facilitate the setting of the cutters on the lower shaft to these distances, I provide a number of ferrules of such size as will allow them to be slipped readily on to the shaft, and of such length as shall adapt them to the setting of the cutters at the proper distances apart; when these are so set, those on the upper shaft may be readily adapted to them, one of these ferrules is shown at $t$, in the section, Fig. 2.

B', B'', and C, C', are the two pairs of wooden rollers that receive and guide the article to be cut; those marked B', B'', receiving the board from the feeding table D, and conducting it to the cutters; and those marked C, C', receiving it as it leaves the cutters after being cut into strips or widths. The table D is furnished with grooves $b\ b$ in which tongues $c\ c$ that are attached to guide pieces $d\ d$ and $e\ e$ are made to slide; against these guide pieces the sheet to be cut is laid, and by advancing the strip $e\ e$, it will be carried correctly forward between the feeding rollers B', B''. The adjusting screws E, E, that operate on the boxes of the upper shaft and rollers, I so attach to said boxes, as to swivel in them, so that they may lift them as well as force them down. F, F, F, are wheels on the gudgeons of the upper shaft and rollers, making a part of the gearing by which the whole are driven. G is a winch by which the machine may be turned.

Having thus fully made known the manner in which I construct the machine herein described, I do hereby declare that I do not claim the use of circular cutters, of feeding rollers, or of a feeding table as in themselves new; but What I do claim as new, and desire to seure by Letters Patent, is—

The manner in which I have arranged and combined the respective parts so as to constitute a new, useful, and improved machine for the cutting of bookbinders' boards &c. into strips or regular widths:—that is to say, I claim the combining of the series of circular cutters with the two pairs of feeding rollers, and with the table D the whole being arranged and operating substantially in the manner herein set forth.

GEO. S. SCOFIELD.

Witnesses:
   JNO. M. HAMILTON,
   FREDK. SCOFIELD.